Patented Mar. 3, 1953

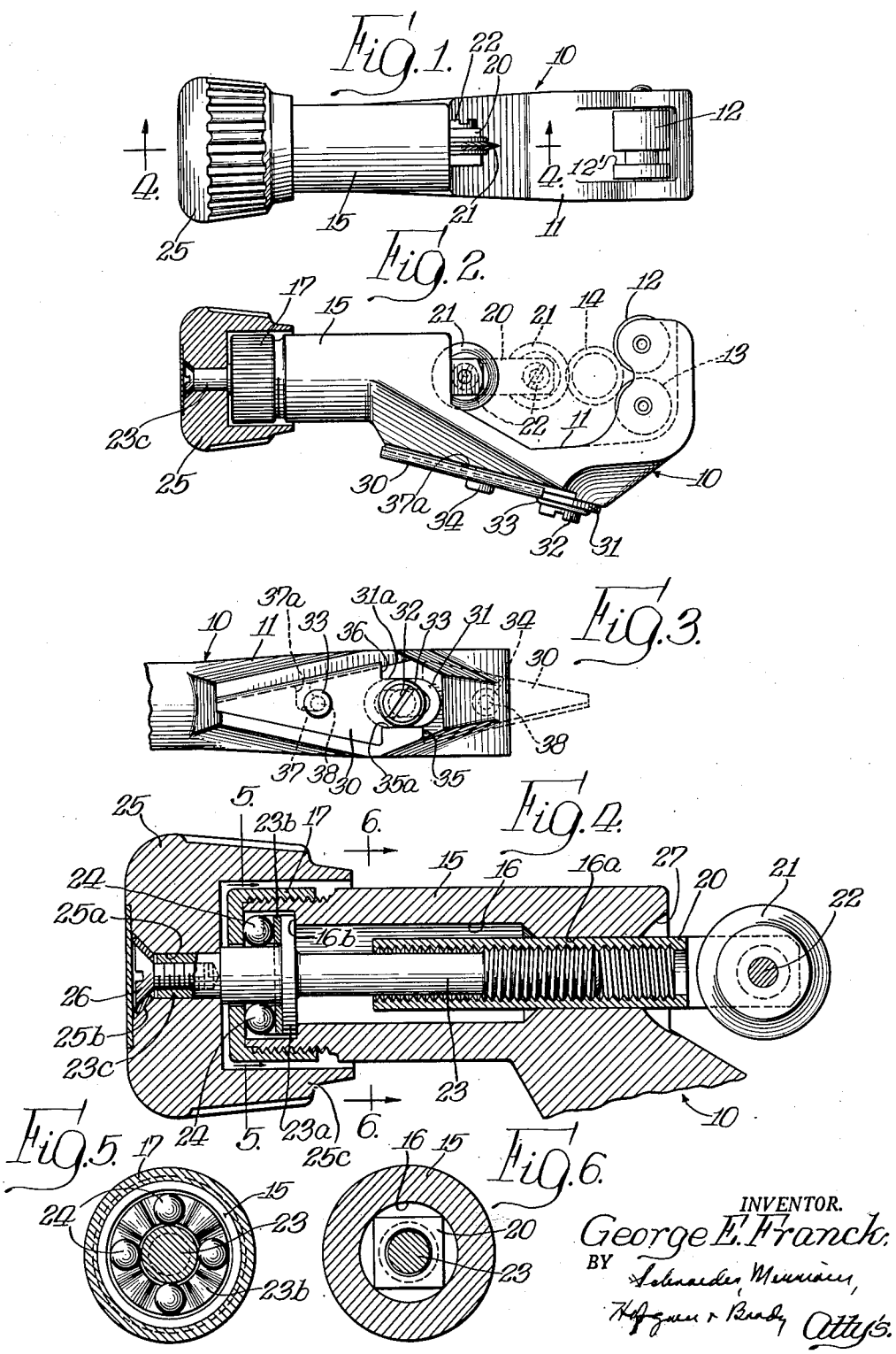

2,629,926

UNITED STATES PATENT OFFICE 2,629,926

CUTTING TOOL

George E. Franck, Riverside, Ill., assignor to The Imperial Brass Manufacturing Company, a corporation of Illinois Application May 6, 1949, Serial No. 91,742

4 Claims. (Cl. 30—102)

This invention relates to a tube cutter, and more particularly to a hand operated tube cutter which may be used by mechanics in cutting relatively small tubing, such as copper, aluminum, steel and the like.

An object of the invention is to provide a tube cutter having anti-friction bearings in the operating means to provide easier operation, particularly when forcing the cutting element against a tube.

Another object of the invention is to provide a tube cutter having anti-friction bearings and having an operating member carrying a rotatable handle with a portion of substantial mass spaced from the axis of rotation of the handle to provide an inertia effect for facilitating free rotation of the operating member.

Another object of the invention is to provide a tube cutter having an anti-friction bearing and being constructed in a manner to protect the bearing and the operating portions from dust and dirt.

Another object of the invention is to provide a tube cutter having a shank with a bore wherein a cutter holding member is movable and the bearing surface of the bore of the shank engages the holding member throughout a space of substantial length to stabilize relative longitudinal movement between said members and prevent angular movement therebetween.

Another object is to provide a tube cutter wherein the shank has a recess for receiving the cutting element to increase the range of movement of the cutting element without increasing the size of the tube cutter.

Another object of the invention is to provide a tube cutter having a reamer mounted thereon for movement between operative and out of the way positions, and provided with means for locking the reamer in either of said positions.

Other features and advantages of the invention will be apparent from the following specification and drawings in which:

Fig. 1 is a top plan view of the tube cutter;

Fig. 2 is a side elevation, partly in section, of the tube cutter of Fig. 1;

Fig. 3 is a fragmentary bottom plan view showing the reamer in out of the way position in solid lines and in operative position in broken lines;

Fig. 4 is an enlarged fragmentary longitudinal section along the line 4—4 of Fig. 1;

Fig. 5 is a transverse section along the line 5—5 of Fig. 4 with the operating handle removed;

Fig. 6 is a transverse section along the line 6—6 of Fig. 4.

Tube cutters and pipe cutters have been known for many years, and particularly cutters of the type having a body member provided with a portion for supporting a tube and having a cutting element such as a disc or knife adapted to be moved toward and away from the tube supporting portion for progressively cutting the tube or pipe upon relative rotation between the tube cutter and the tube or pipe. In such cutters an operating member has merely been threaded through the body member so that the cutting element may be moved toward or away from the tube to be cut upon rotation of an operating handle. Such construction has been found to be disadvantageous inasmuch as it is a bothersome and time consuming operation to rotate the handle sufficiently to move the cutting element throughout its range of movement, and excessive force has been required to turn the handle during the cutting operation because of the great amount of friction involved. I have devised and am herewith disclosing and claiming a tube cutter of this general type, but incorporating anti-friction means for facilitating operation of the device. In my improved tube cutter a single spin of the operating handle will move the cutting element substantially entirely throughout its range of movement and it is not necessary to complete each turn of the operating handle by hand. This speeds up the operation and makes the cutter much more convenient to use. Furthermore, the anti-friction bearing eliminates much friction in the operation of the device and much less force is required to turn the handle in cutting through a tube. In addition, the mass of the operating handle is spaced from the axis of rotation, creating an inertia effect (as in a fly wheel) upon the rapid spinning movement above described, thereby facilitating free movement of the parts.

As an additional feature of my invention, I have constructed the shank portion of the body to be at least substantially as long as the operating portion of the body and have provided a bearing surface in the shank of substantial length to stabilize relative longitudinal movement between the parts of the cutter and prevent angular movement therebetween. Additionally, the face of the shank portion of the body is recessed to receive the cutting disc, thereby increasing the range of movement of the disc without increasing the size of the tool and with my improved cutter a cutting range for tubes of from one eighth inch to one inch in outside diameter may be provided while the tool may have an overall length of only four inches so that it may readily be carried in the pocket of a workman, if desired.

Inasmuch as the cutting operation very often results in small burrs in the bore of the tube which has been cut, it is often necessary for the workman to clear these burrs from the tube with a reamer after the cutting operation. I have provided a tube cutter having a reamer mounted on the bottom of the cutter and pivotally movable between operative and inoperative positions. In addition to being pivotally movable the reamer is mounted for limited longitudinal movement and locking means are provided for locking the reamer against pivotal movement in either of its positions.

Referring now more particularly to the drawings, the tube cutter has a body member designated generally at 10 having an operating portion 11 across which the cutting element may move and having tube supporting means comprising a pair of rollers 12 and 13 forming between them a groove adapted to support a tube 14 to be cut. In the embodiment illustrated in the drawings each roller has a groove 12' for receiving a flange or flare at the end of the tube. In remaking tube connections it sometimes becomes necessary or desirable to cut off the flanged or flared portion and again flare the tube. The provision of the groove 12' makes it possible to cut off the tube at the base of the flange or flare with a minimum of waste.

The body member 10 is also provided with a shank portion 15 having a bore 16. Referring to Fig. 4, a portion of the bore shown at 16a is arranged to provide a bearing surface of substantial length in the bore, and the shank portion 15 preferably has a length substantially the same as the length of the operating portion 11 to provide this long bearing surface and to provide for substantial movement of the cutting element. At its back end the shank portion 15 is threaded and is capped with a cap 17 having an axial opening through its face.

A cutter holding member 20 is mounted in the shank of the bore, both the member and at least the bearing portion of the bore preferably being polygonal to prevent rotation of the holding member with respect to the body portion of the tool. The engagement of the holding member with the long bearing surface 16a stabilizes the holding member for longitudinal movement in the bore of the shank and prevents angular movement between the holding member and the body member. A cutting element comprising a cutting wheel or disc 21 is mounted for rotation at the end of the member 20 by means of a screw 22, the member 20 being bifurcated for that purpose.

As may be seen in Fig. 4 the member 20 is provided with a threaded bore and an operating member 23 is threaded into this bore and extends out through the opening in the cap 17. A collar 23a on the member 23 seats against a shoulder 16b in the bore 16 of the shank and the face of the collar opposite the shoulder is provided with a plate 23b, forming a bearing race. Anti-friction bearings 24 are mounted in the space between the plate 23b and the inner face of the cap 17 to form a thrust bearing. At its outer end the operating member 23 has mounted thereon a knob or operating handle 25 which preferably has a knurled surface as shown in Fig. 1. The knob has a bore 25a to receive tightly therein a reduced end portion 23c of the member 23 and a countersink 25b to receive the head of a screw 26 threaded into the end of the operating member 23 to prevent relative movement between the knob 25 and the operating member 23. The knob 25 also has a skirt 25c extending inwardly to cover the cap 17.

It will be seen that rotation of the handle 25 moves the cutting element 21 toward or away from the rollers 12 and 13. As shown in Fig. 4 the face of the shank portion is recessed at 27 to receive the cutting element 21, thereby increasing the range of movement of this element without increasing the overall length of the tool. When it is desired to move the cutting element from its terminal position as shown in Fig. 1 into the position wherein it may engage and cut a relatively small tube, it is not necessary to rotate the knob 25 through each turn by hand, but instead the knob 25 may be grasped and spun, and the anti-friction bearings will permit the operating member 23 to spin freely. Additionally, the bulk of the mass of the handle is spaced from the axis of rotation, thus providing an inertia or fly wheel effect which aids the free rotation of the parts. With my improved construction the cutting disc may be moved from the solid line position of Fig. 2 to or even beyond the broken line position of Fig. 2 by means of a single twist or spin of the knob 25. Furthermore, with the bearing 24 taking the thrust, much less force or torque is required to turn the knob for each successive advance of the cutting disc during the cutting operation.

The construction above described results in another advantage inasmuch as the threaded engagement of the member 23 in the bore of the member 20 is enclosed in a housing formed by the shank with its cap 17, thereby keeping dust and dirt out of these threads and out of the ball bearings.

Once the tube has been cut it is likely that a thin burr will be found in the bore of the tube, and this burr must be removed. Instead of requiring the workman to pick up a special burr removing tool, a reamer is provided on the tube cutter itself. The structure comprises a triangular reamer member 30 having a projection 31 at its base end with an elongated closed slot therein. A screw 32 is utilized to mount the reamer member on the bottom of the body portion of the tube cutter for pivotal movement and for limited longitudinal movement, the range of which is determined by the length of the slot. Preferably, a spring washer 33 is mounted on the screw to provide a friction component.

By means of the pivotal mounting the reamer may be moved between the out of the way position shown in Fig. 2 and shown in solid lines in Fig. 3 and an operative position shown in broken lines in Fig. 3. A gripping member 34 projects from the outer surface of the reamer for facilitating movement of the reamer between its various positions. First locking means are provided for locking the reamer against pivotal movement when it is in operative position, this means comprising cooperating shoulders 35 on the body member 10 and 36 on the reamer and cooperating shoulders 35a on the body member and 31a on the projection 31, so that when the reamer is pivoted to operative position and moved longitudinally to the left (as the parts appear in Fig. 3) to the limit of its travel these two shoulders abut, preventing pivotal movement of the reamer. When the reamer is in this position, the workman may grasp the body 10 to obtain the necessary leverage to ream the burr from the bore of the tube.

Second locking means are provided for locking the reamer against pivotal movement when it is in out of the way position and is moved to the right (in Fig. 3) to the limit of its longitudinal travel. This locking means comprises a groove 37 in the body member, the groove being generally L-shaped with the stem portion 37a forming an opening to admit a detent 38 on the underside of the reamer. When the reamer is moved longitudinally to its locked position as shown in Fig. 3, the detent enters the base portion of the L-shaped groove and prevents pivotal movement of the reamer.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. A tube cutter comprising an elongated body member having an operating portion with tube supporting means and an integral shank portion with a bore having a polygonal portion at its outer end of substantial length, said shank portion being substantially as long as said operating portion and said polygonal portion providing a bearing surface of substantial length in said bore, a shoulder in said bore spaced from said polygonal portion, an elongated cutter holding member having a cutting element thereon, said holding member being movable in said bore and having a portion of polygonal transverse cross-section engaging said bearing surface throughout the entire length of said bearing surface to prevent angular movement between said body member and holding member, and said holding member having a longitudinal threaded bore, an operating member having a portion threaded into said threaded bore and a collar engaging said shoulder, a cap threaded to the inner end of said shank and providing a bearing surface transverse of the bore of said shank and spaced from said shoulder, an anti-friction thrust bearing engaging said cap and said collar, and an operating handle for rotating said operating member to provide relative longitudinal movement between said body member and holding member to move said cutting element toward and away from said tube supporting means.

2. Apparatus of the character claimed in claim 1, wherein the collar on said operating member has a bearing surface adapted to take the thrust when said cutting element is moved away from said tool supporting means, and wherein the means which provide a bearing surface transverse of said bore engage said anti-friction bearing and take the thrust when said cutting element is moved toward said tube supporting means and is forced against said tube.

3. A tube cutter comprising an elongated body member having an operating portion with tube supporting means and an integral shank portion with a bore having a polygonal portion at its outer end of substantial length, said polygonal portion providing a bearing surface of substantial length in said bore, a shoulder in said bore spaced from said polygonal portion, an elongated cutter holding member having a cutting element thereon, said holding member being movable in said bore and having a portion of polygonal transverse cross-section engaging said bearing surface throughout the entire length of said bearing surface to prevent angular movement between said body member and holding member, and said holding member having a longitudinal threaded bore, an operating member having a portion threaded into said threaded bore and a collar engaging said shoulder, a cap secured to the inner end of said shank and providing a bearing surface transverse of the bore of said shank and spaced from said shoulder, an anti-friction thrust bearing engaging said cap and said collar, a relatively massive knob secured to said operating member for rotating the same to provide relative longitudinal movement between said body member and holding member to move said cutting element toward and away from said tube supporting means, said knob being provided with a cylindrical bore having side walls closely overlying the inner end of the shank portion.

4. A tube cutter comprising an elongated body member having an operating portion with tube supporting means and an integral shank portion with a bore having a polygonal portion at its outer end providing a bearing surface in said bore, a shoulder in said bore spaced from said polygonal portion, an elongated cutter holding member having a cutting element thereon, said holding member being movable in said bore and having a portion of polygonal transverse cross-section engaging said bearing surface to prevent angular movement between said body member and holding member, and said holding member having a longitudinal threaded bore, an operating rod having a portion threaded into said threaded bore and a collar engaging said shoulder, a cap threaded to the inner end of said shank and having an apertured top through which the rod extends with the remainder of the top providing a bearing surface transverse of the bore of said shank and spaced from said shoulder, an anti-friction thrust bearing engaging such bearing surface and said collar, a relatively massive knob secured to said operating rod for rotating the same to provide relative longitudinal movement between said body member and holding member to move said cutting element toward and away from said tube supporting means, said handle possessing sufficient mass spaced from the axis of rotation of said operating member to provide an inertia effect for facilitating free rotation of said operating rod and said knob having a cylindrical bore having side walls closely overlying the cap and the inner end of the shank portion.

GEORGE E. FRANCK.

REFERENCES CITED

The following references are of record in the file of this patent:

UNITED STATES PATENTS

| Number | Name | Date |
|---|---|---|
| 164,368 | Fenton | June 15, 1875 |
| 343,233 | Esten | June 8, 1886 |
| 505,960 | Scholz | Oct. 3, 1893 |
| 554,420 | Hall | Feb. 11, 1896 |
| 621,305 | Kaiser | Mar. 14, 1899 |
| 1,945,949 | Myers | Feb. 6, 1934 |
| 2,165,209 | Baldanza | July 11, 1939 |
| 2,350,700 | Segeberg | June 6, 1944 |
| 2,360,887 | Parker | Oct. 24, 1944 |
| 2,366,257 | Hartley | Jan. 2, 1945 |